United States Patent [19]

Missfeldt

[11] Patent Number: 5,512,428
[45] Date of Patent: Apr. 30, 1996

[54] PHOTOGRAPHIC RECORDING MATERIALS

[75] Inventor: Michael Missfeldt, Leichlingen, Germany

[73] Assignee: Agfa-Gevaert AG, Germany

[21] Appl. No.: 314,592

[22] Filed: Sep. 28, 1994

[30] Foreign Application Priority Data

Oct. 13, 1993 [DE] Germany ............ 43 34 787.8
Dec. 14, 1993 [DE] Germany ............ 43 42 617.4

[51] Int. Cl.⁶ .................... G03C 1/16; G03C 1/18
[52] U.S. Cl. ............... 430/583; 430/585; 430/588
[58] Field of Search ........................ 430/583, 584, 430/585, 588, 590

[56] References Cited

U.S. PATENT DOCUMENTS

| | | | |
|---|---|---|---|
| 2,065,412 | 12/1936 | Zeh | 430/583 |
| 3,243,298 | 3/1966 | Libeer | 430/583 |
| 5,206,126 | 4/1993 | Shimazaki et al. | 430/588 |

FOREIGN PATENT DOCUMENTS

| | | |
|---|---|---|
| 0176483 | 4/1986 | European Pat. Off. . |
| 749494 | 1/1945 | Germany . |
| 5308 | 5/1953 | Germany . |
| 892965 | 10/1953 | Germany . |
| 1569790 | 4/1970 | Germany . |
| 4365031 | 12/1992 | Japan .............. 430/583 |
| 1560537 | 4/1990 | U.S.S.R. . |
| 1137084 | 12/1968 | United Kingdom . |
| 1402881 | 8/1975 | United Kingdom . |
| 1494740 | 12/1977 | United Kingdom . |
| 1596836 | 9/1981 | United Kingdom . |

OTHER PUBLICATIONS

EP 0126990, Dec. 1984, pp. 44–55 and 121–128.

*Primary Examiner*—Lee C. Wright
*Attorney, Agent, or Firm*—Connolly & Hutz

[57] ABSTRACT

Phenanthroazole cyanines and anthraazole cyanines, having not less than one acidic group, of the formula I are excellent spectral sensitizers.

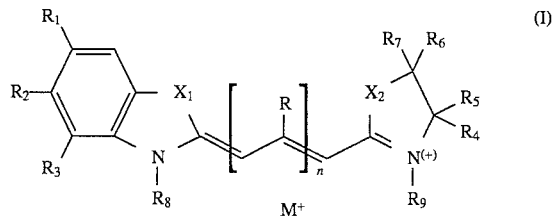

The symbols in formula I have the following meanings $X_1$ and $X_2$ O, S, Se or $NR_{10}$;

$R_1$ and $R_2$ or $R_2$ and $R_3$ residues of an optionally substituted phenanthroazole or anthraazole with the remaining group $R_3$ or $R_1$ signifying hydrogen;

$R_4$ and $R_6$ hydrogen or together a π-bond, $R_5$ and $R_7$ hydrogen, alkyl or aryl or $R_4, R_5, R_6$ and $R_7$ residues of an optionally substituted benzazole, naphthazole, phenanthroazole or anthraazole;

$R_8$, $R_9$ alkyl, sulphoalkyl, carboxyalkyl, $-(CH_2)_m-CO-NR_{11}-SO_2-R_{12}$ or $-(CH_2)_m-SO_2-NR_{11}-CO-R_{12}$;

$R_{10}$ a residue as defined for $R_8/R_9$ or aryl;

$R_{11}$ hydrogen or the negative charge (⊖) which remains when a proton is removed;

$R_{12}$ alkyl, aryl, $-O^⊖$, $-N(R_{13})_2$;

$R_{13}$ hydrogen, alkyl or aryl (the same or different);

R hydrogen, $C_1-C_4$-alkyl, $C_1-C_4$-alkylthio or phenyl;

m an integer from 1 to 10;

n 0 or 1; and $M^+$ a cation optionally required to neutralize the charge, with the proviso that the cyanine dye having the formula I possesses not less than one group, selected from the group consisting of a sulphoalkyl group, a carboxyalkyl group, a group $-(CH_2)_m-CO-NR_{11}-SO_2-R_{12}$ and a group $-(CH_2)_m-SO_2-NR_{11}-CO-R_{12}$.

3 Claims, No Drawings

PHOTOGRAPHIC RECORDING MATERIALS

The invention relates to a photographic recording material having not less than one layer of silver halide emulsion, whereof the silver halide emulsion has not less than one spectral sensitizer of the cyanine series containing at least one phenanthroazole group or anthraazole group.

Cyanine dyes containing azolidinene as donor groups or acceptor groups are well-known as spectral sensitizers. Anellated compounds of these groups, for example, benzoxazole cyanines and naphthoxazole cyanines, generally lead to good sensitivities in silver halide emulsions.

Of the cyanine dyes having three anellated benzene rings, to date several weakly cationic anthrathiazole trimethines (I. I. Levkoev, V. V. Durmashkina, J. Gen. Chem. (USSR), 15, 215–224 (1945); CA 2989/3 (1946)) have become known but they are inferior to benzothiazole cyanine and naphthothiazole cyanine as regards their sensitizing action.

Surprisingly, it was then found that phenanthroazole cyanines and anthraazole cyanines having not less than one sulphoalkyl group are excellent spectral sensitizers.

The present invention therefore provides a photographic recording material having not less than one light-sensitive silver halide emulsion layer, whereof the silver halide is spectrally sensitized by a cyanine dye of the general formula I,

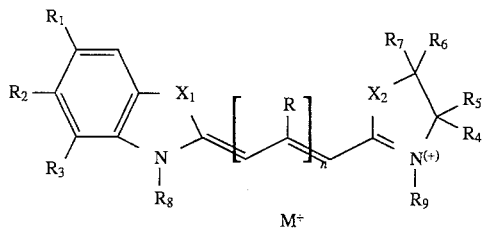

wherein the symbols have the following meanings:

$X_1$ and $X_2$ O, S, Se or $NR_{10}$;

$R_1$ and $R_2$ or $R_2$ and $R_3$ residues of an optionally substituted phenanthroazole or anthraazole with the remaining group $R_3$ or $R_1$ signifying hydrogen;

$R_4$ and $R_6$ hydrogen or together a $\pi$-bond, $R_5$ and $R_7$ hydrogen, alkyl or aryl or $R_4$, $R_5$, $R_6$ and $R_7$ residues of an optionally substituted benzazole, naphthazole, phenanthroazole or anthraazole;

$R_8$, $R_9$ alkyl, sulphoalkyl, carboxyalkyl, —$(CH_2)_m$—CO—$NR_{11}$—$SO_2$—$R_{12}$ or —$(CH_2)_m$—$SO_2$—$NR_{11}$—CO—$R_{12}$;

$R_{10}$ a residue as defined for $R_8$/$R_9$ or aryl;

$R_{11}$ hydrogen or the negative charge ($\ominus$) which remains when a proton is removed;

$R_{12}$ alkyl, aryl, —$O^\ominus$, —$N(R_{13})_2$;

$R_{13}$ hydrogen, alkyl or aryl (the same or different);

R hydrogen, $C_1$–$C_4$-alkyl, $C_1$–$C_4$-alkylthio or phenyl;

m an integer from 1 to 10;

n 0 or 1; and $M^+$ a cation optionally required to neutralize the charge, with the proviso that the cyanine dye having the formula I possesses not less than one group, selected from the group consisting of a sulphoalkyl group, a carboxyalkyl group, a group —$(CH_2)_m$—CO—$NR_{11}$—$SO_2$—$R_{12}$ and a group —$(CH_2)_m$—$SO_2$-$NR_{11}$—CO-$R_{12}$.

A sulphoalkyl group represented by $R_8$, $R_9$ or $R_{10}$ may optionally be substituted, for example, by —OH.

Suitable examples of sensitizing dyes according to the invention having the general formula I may be:

$X_1 = X_2 = O$, $R_1 = H$, $R_8 = R_9 =$ sulphopropyl, FS 1
$R =$ ethyl, $n = 1$, $M^+ = K^+$,

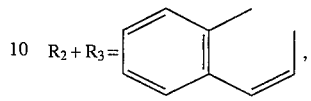

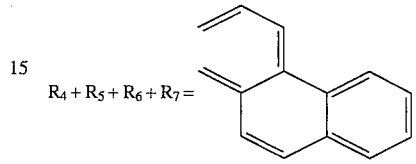

$X_1 = O$, $X_2 = S$, $R_1 = H$, $R_8 = R_9 =$ sulphopropyl, FS 2
$R =$ ethyl, $n = 1$, $M^+ = Na^+$,

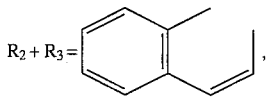

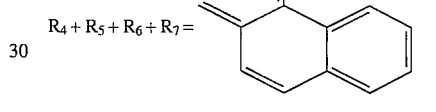

$X_1 = O$, $X_2 = S$, $R_1 = H$, $R_8 = R_9 =$ sulphopropyl, FS 3
$R =$ ethyl, $n = 1$, $M^+ = Na^+$,

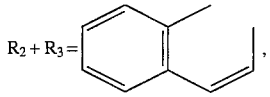

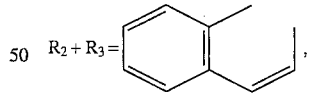

$X_1 = O$, $X_2 = S$, $R_1 = H$, $R_8 = R_9 =$ sulphopropyl, FS 4
$R =$ ethyl, $n = 1$, $M^+ = Na^+$, $X_1 = O$, $X_2 =$ NEthyl, $R_1 = H$, $R_8 = R_9 =$ sulphopropyl, FS 5
$R = H$, $n = 1$, $M^+ =$ ethyl$_3$N$^+$H,

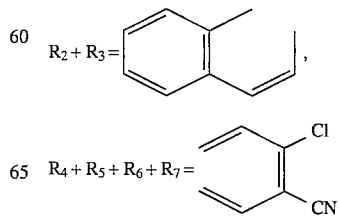

$X_1 = O$, $X_2 = $ NEthyl, $R_1 = H$, $R_8 = R_9 = $ sulphopropyl, $R = H$, $n = 1$, $M^+ = $ ethyl$_3$N$^+$H,    FS 6

$R_2 + R_3 = $ 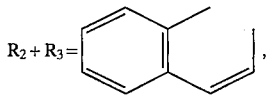, $R_4 + R_5 + R_6 + R_7 = $ 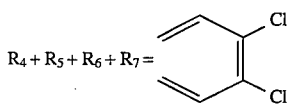

$X_1 = O$, $X_2 = $ NEthyl, $R_1 = H$, $R_8 = R_9 = $ sulphopropyl, $R = H$, $M^+ = $ ethyl$_3$N$^+$H,    FS 7

$R_2 + R_3 = $ 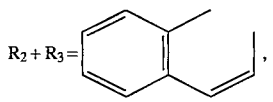, $R_4 + R_5 + R_6 + R_7 = $ 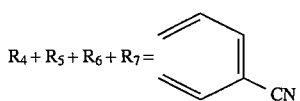

$X_1 = O$, $X_2 = S$, $R_1 = H$, $R_4 = R_5 = R_6 = R_7 = H$, $R_8 = R_9 = $ sulphopropyl, $R = $ ethyl, $n = 1$, $M^+ = $ ethyl$_3$N$^+$H,    FS 8

$R_2 + R_3 = $ 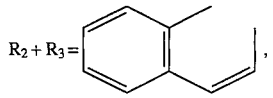, $X_1 = X_2 = O$, $R_1 = H$, $R_8 = $ sulphopropyl, $R_9 = $ ethyl, $R = $ ethyl, $n = 1$, $M^+ = $ ethyl$_3$N$^+$H,    FS 9

$R_2 + R_3 = $ 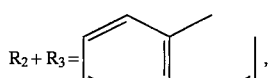, $R_4 + R_5 + R_6 + R_7 = $ 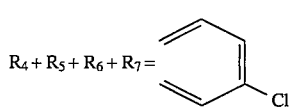

$X_1 = X_2 = O$, $R_1 = H$, $R_8 = R_9 = $ sulphopropyl, $R = $ ethyl, $n = 1$, $M^+ = $ ethyl$_3$N$^+$H,    FS 10

$R_2 + R_3 = $ 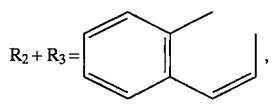, $R_4 + R_5 + R_6 + R_7 = $ 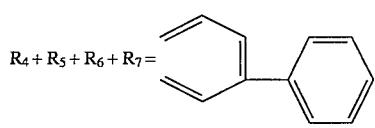

$X_1 = X_2 = O$, $R_1 = H$, $R_8 = R_9 = $ sulphopropyl, $R = $ ethyl, $n = 1$, $M^+ = $ K$^+$,    FS 11

$R_2 + R_3 = $ 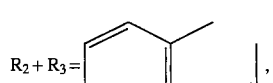, $R_4 + R_5 + R_6 + R_7 = $ 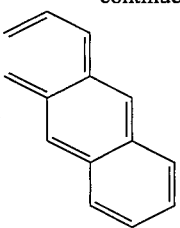

$X_1 = X_2 = O$, $R_1 = H$, $R_8 = R_9 = $ sulphopropyl, $R = $ ethyl, $n = 1$, $M^+ = $ K$^+$,    FS 12

$R_2 + R_3 = $ 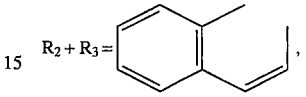, $R_4 + R_5 + R_6 + R_7 = $ 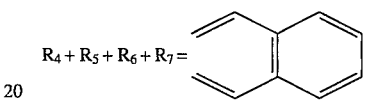

$X_1 = X_2 = O$, $R_1 = H$, $R_8 = R_9 = $ sulphopropyl, $R = $ ethyl, $n = 1$, $M^+ = $ K$^+$,    FS 13

$R_2 + R_3 = $ 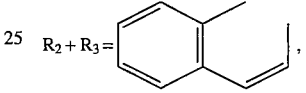, $R_4 + R_5 + R_6 + R_7 = $ 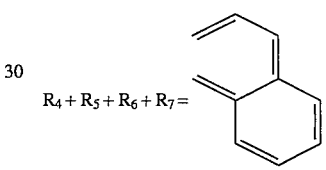

$X_1 = S$, $X_2 = O$, $R_1 = H$, $R_8 = R_9 = $ sulphopropyl, $R = $ ethyl, $n = 1$, $M^+ = $ Na$^+$,    FS 14

$R_2 + R_3 = $ 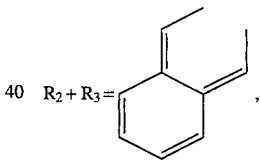, $R_4 + R_5 + R_6 + R_7 = $ 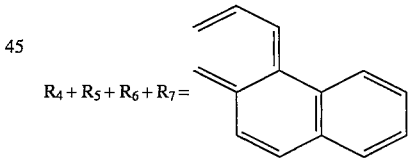

$X_1 = S$, $X_2 = O$, $R_1 = H$, $R_8 = $ sulphopropyl, $R_9 = R = $ ethyl, $n = 1$,    FS 15

$R_2 + R_3 = $ 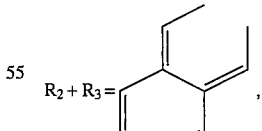, $R_4 + R_5 + R_6 + R_7 = $ 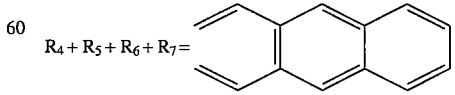

$X_1 = S$, $X_2 = O$, $R_1 = H$, $R_8 = R_9 = $ sulphopropyl, $R = $ ethyl, $n = 1$, $M^+ = $ Na$^+$,    FS 16

$R_2 + R_3 =$ 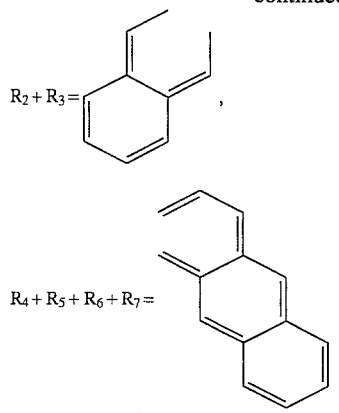

$R_4 + R_5 + R_6 + R_7 =$ $X_1 = S, X_2 = O, R_1 = H, R_8 = $ sulphopropyl, $R_9 = R = $ ethyl, $n = 1$, $R_2 + R_3 =$ $R_4 + R_5 + R_6 + R_7 =$ 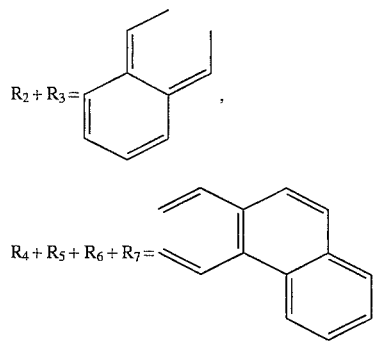

$X_1 = X_2 = S, R_1 = H, R_8 = R_9 = $ sulphopropyl, $R = $ ethyl, $n = 1$, $M^+ = $ ethyl$_3$N$^+$H, $R_2 + R_3 =$ $R_4 + R_5 + R_6 + R_7 =$ 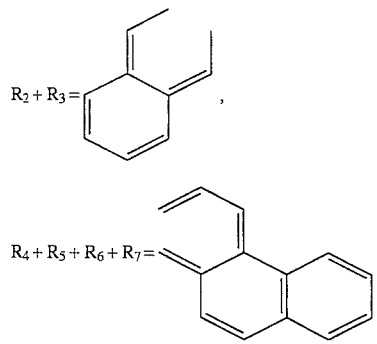

$X_1 = S, X_2 = $ NEthyl, $R_8 = R_9 = $ sulphopropyl, $R_1 = R = H, n = 1, M^+ = $ ethyl$_3$N$^+$H, $R_2 + R_3 =$ $R_4 + R_5 + R_6 + R_7 =$ 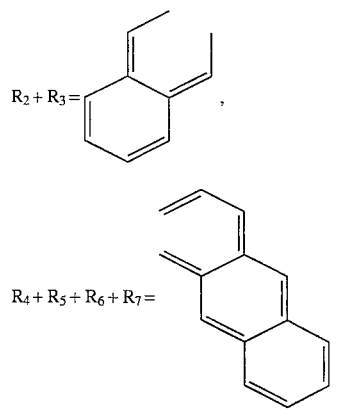

$X_1 = X_2 = S, R_1 = H, R_8 = R_9 = $ sulphopropyl, $R = $ ethyl, $n = 1$, $M^+ = $ ethyl$_3$N$^+$H,      FS 20

$R_2 + R_3 =$ $R_4 + R_5 + R_6 + R_7 =$ 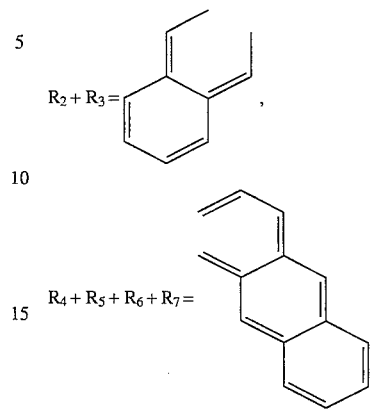

$X_1 = X_2 = S, R_1 = H, R_8 = R_9 = $ sulphopropyl, $R = $ ethyl, $n = 1$, $M^+ = $ ethyl$_3$N$^+$H,      FS 21

$R_2 + R_3 =$ $R_4 + R_5 + R_6 + R_7 =$ 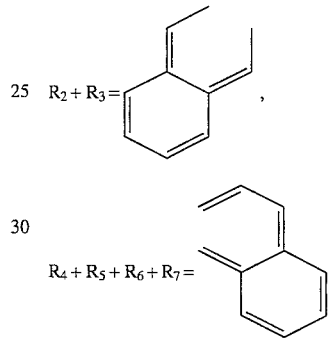

$X_1 = X_2 = S, R_1 = H, R_8 = R_9 = $ sulphopropyl, $R = $ ethyl, $n = 1$, $M^+ = $ ethyl$_3$N$^+$H,      FS 22

$R_2 + R_3 =$ $R_4 + R_5 + R_6 + R_7 =$ 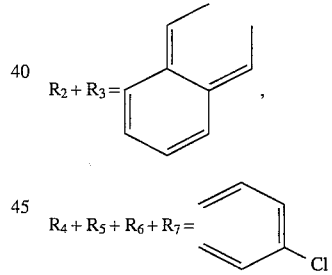

$X_1 = S, X_2 = O, R_1 = H, R_8 = R_9 = $ sulphopropyl, $R = $ ethyl, $n = 1$, $M^+ = $ Na$^\oplus$,      FS 23

$R_2 + R_3 =$ 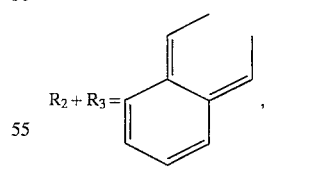

$R_4 + R_5 + R_6 + R_7 =$ 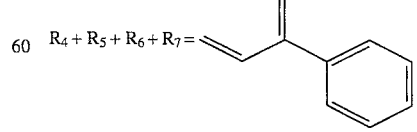

$X_1 = S, X_2 = O, R_1 = H, R_8 = R_9 = $ sulphopropyl, $R = $ ethyl, $n = 1$, $M^+ = $ Na$^+$,      FS 24

FS 17

FS 18

FS 19

$R_2 + R_3 =$ 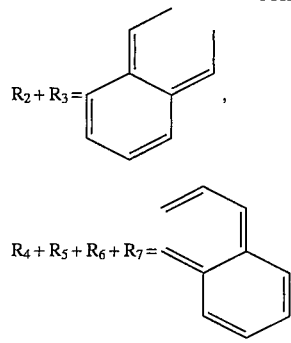

$R_4 + R_5 + R_6 + R_7 =$ 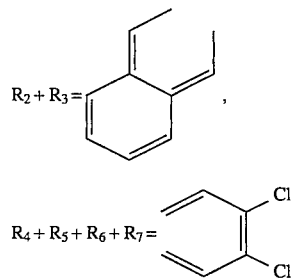

$X_1 = S, X_2 = NEthyl, R = R_1 = H, R_8 = sulphopropyl,$
$R_9 = sulphobutyl, n = 1, M^+ = ethyl_3N^+H,$  FS 25

$R_2 + R_3 =$ 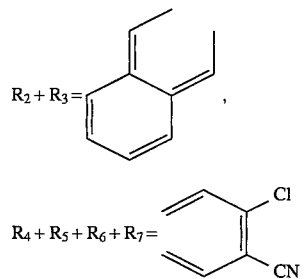

$R_4 + R_5 + R_6 + R_7 =$ 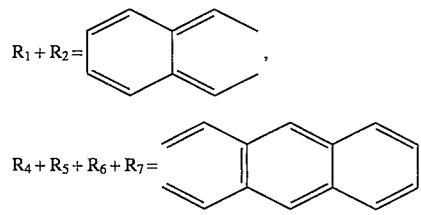

$X_1 = S, X_2 = NEthyl, R = R_1 = H, R_8 = sulphopropyl,$
$R_9 = 3$-methylsulphopropyl,   FS 26

$R_2 + R_3 =$ 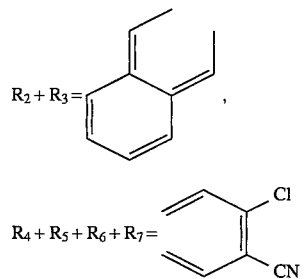

$R_4 + R_5 + R_6 + R_7 =$ 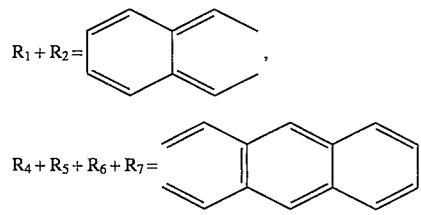

$X_1 = X_2 = O, R_3 = H, R_8 = R_9 = sulphopropyl,$
$R = ethyl, n = 1, M^+ = ethyl_3N^+H,$   FS 27

$R_1 + R_2 =$ 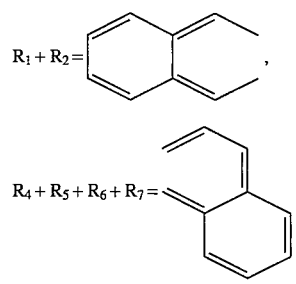

$R_4 + R_5 + R_6 + R_7 =$ $X_1 = X_2 = O, R_3 = H, R_8 = sulphopropyl,$
$R_9 = ethyl, R = ethyl, n = 1,$   FS 28

$R_1 + R_2 =$ $R_4 + R_5 + R_6 + R_7 =$ $X_1 = O, X_2 = S, R_3 = H, R_8 = R_9 = sulphopropyl,$
$R = ethyl, n = 1, M^+ = Na^+,$   FS 29

$R_1 + R_2 =$ 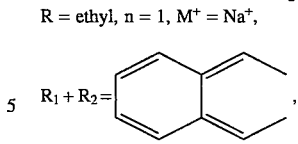

$R_4 + R_5 + R_6 + R_7 =$ 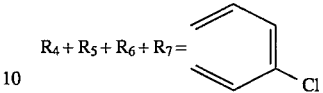

$X_1 = X_2 = O, R_3 = H, R_8 = sulphopropyl,$
$R_9 = sulphoethyl, R = ethyl, n = 1, M^+ = Na^+,$   FS 30

$R_1 + R_2 =$ 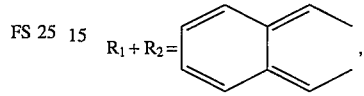

$R_4 + R_5 + R_6 + R_7 =$ 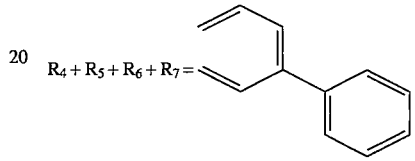

$X_1 = O, X_2 = NEthyl, R_3 = H, R_8 = sulphopropyl,$
$R_9 = ethyl, R = H, n = 1,$   FS 31

$R_1 + R_2 =$ 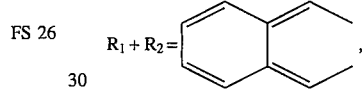

$R_4 + R_5 + R_6 + R_7 =$ 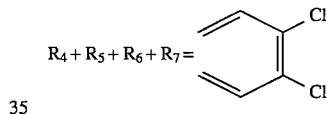

$X_1 = X_2 = O, R_1 = H, R_8 = R_9 = sulphopropyl,$
$R = ethyl, n = 1, M^+ = K^+,$   FS 32

$R_2 + R_3 =$ 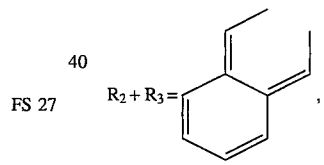

$R_4 + R_5 + R_6 + R_7 =$ 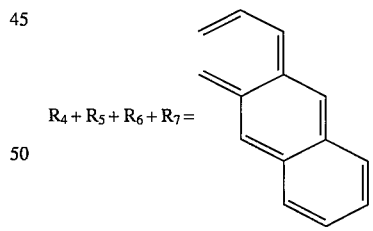

$X_1 = X_2 = O, R_1 = H, R_8 = ethyl,$
$R_9 = sulphopropyl, R = ethyl, n = 1,$   FS 33

$R_2 + R_3 =$ 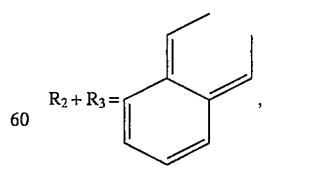

$R_4 + R_5 + R_6 + R_7 =$ 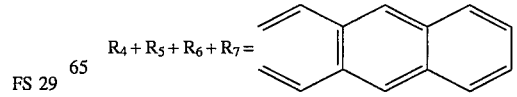

$X_1 = O$, $X_2 = S$, $R_1 = H$, $R_8 =$ sulphopropyl,
$R_9 =$ sulphobutyl, $R =$ ethyl, $n = 1$, $M^+ = Na^+$, $R_2 + R_3 =$ 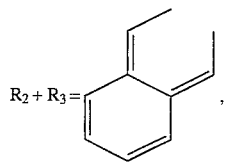, $R_4 + R_5 + R_6 + R_7 =$ 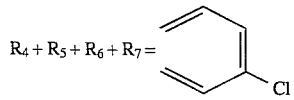

$X_1 = O$, $X_2 = S$, $R_1 = H$, $R_8 = R_9 =$ sulphopropyl,
$R =$ ethyl, $n = 1$, $M^+ = Na^+$, $R_2 + R_3 =$ 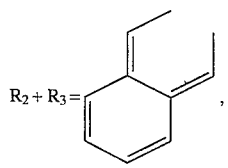, $R_4 + R_5 + R_6 + R_7 =$ 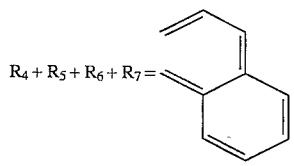

$X_1 = O$, $X_2 =$ NEthyl, $R_1 = H$, $R_8 =$ sulphopropyl,
$R_9 =$ sulphobutyl, $R = H$, $n = 1$, $M^+ = Na^+$, $R_2 + R_3 =$ 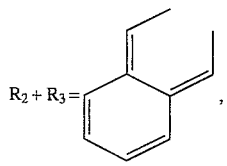, $R_4 + R_5 + R_6 + R_7 =$ 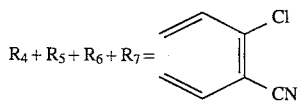

$X_1 = X_2 = O$, $R_1 = H$, $R_5 + R_7 =$ phenyl,
$R_4 + R_6 = \pi$-bond, $R_8 =$ sulphopropyl,
$R_9 =$ ethyl, $R =$ methyl, $n = 1$, $R_2 + R_3 =$ 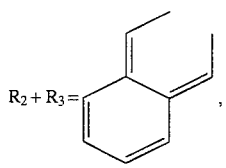, $X_1 = S$, $X_2 = O$, $R_1 = H$, $R_8 =$ ethyl,
$R_9 =$ sulphopropyl, $n = 1$, $R =$ ethyl, $R_2 + R_3 =$ 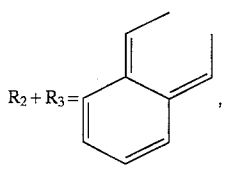,

FS 34

$R_4 + R_5 + R_6 + R_7 =$ 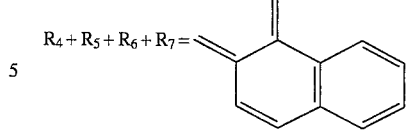

$X_1 = S$, $X_2 =$ NEthyl, $R_1 = H$, $R_8 =$ ethyl, FS 35
$R_9 =$ sulphopropyl, $R = H$, $n = 1$, $R_2 + R_3 =$ 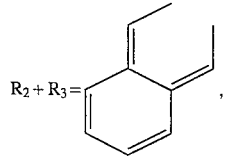, $R_4 + R_5 + R_6 + R_7 =$ 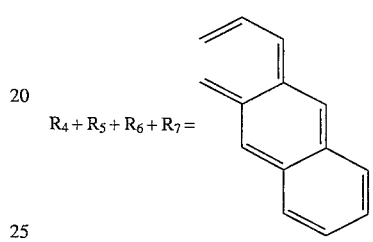

$X_1 = O$, $X_2 = S$, $R_1 = H$, $R_8 =$ ethyl, FS 36
$R_9 =$ sulphopropyl, $n = 1$, $R =$ ethyl, $R_2 + R_3 =$ 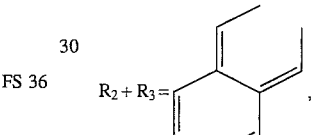, $R_4 + R_5 + R_6 + R_7 =$ 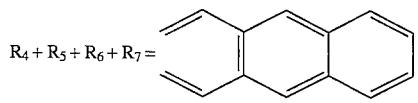

$X_1 = X_2 = S$, $R_1 = H$, $R_8 =$ ethyl, FS 37
$R_9 =$ sulphopropyl, $n = 1$, $R =$ ethyl, $R_2 + R_3 =$ 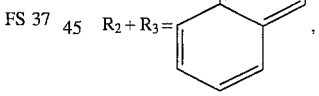, $R_4 + R_5 + R_6 + R_7 =$ 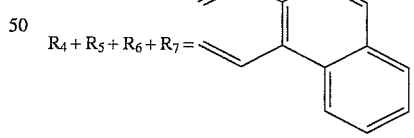

$X_1 = O$, $X_2 = S$, $R_1 = H$, $R_8 =$ ethyl, FS 38
$R_9 =$ sulphopropyl, $n = 1$, $R =$ ethyl, $R_2 + R_3 =$ 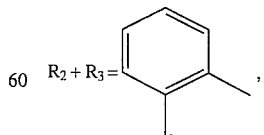,

FS 39

FS 40

FS 41

FS 42

-continued

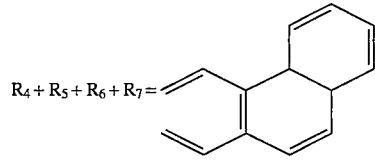

$X_1 = O$, $X_2 = $ NEthyl, $R_1 = H$, $R_8 = $ ethyl,
$R_9 = $ sulphopropyl, $n = 1$, $R = H$,

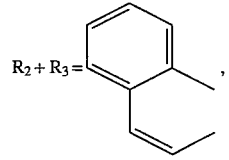

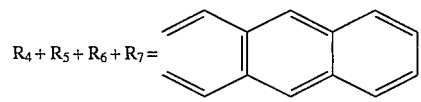

$X_1 = O$, $X_2 = S$, $R_1 = H$, $R_8 = R_9 = $ sulfopropyl,
$n = 0$, $M^+ = $ ethyl$_3$N$^+$H,

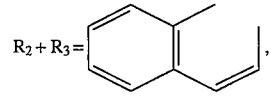

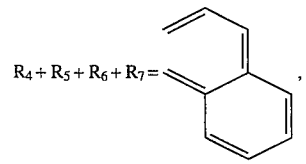

$X_1 = O$, $X_2 = S$, $R_1 = H$, $R_8 = R_9 = $ sulfopropyl,
$n = 0$, $M^+ = $ ethyl$_3$N$^+$H,

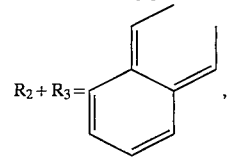

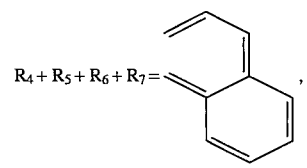

$X_1 = O$, $X_2 = S$, $R_3 = H$, $R_8 = $ ethyl,
$R_9 = $ sulfopropyl, $n = 0$,

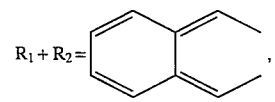

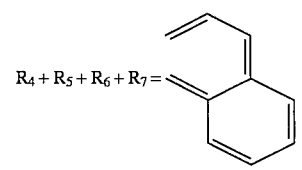

$X_1 = $ N-methyl, $X_2 = S$, $R_1 = H$, $R_8 = $ sulphobutyl,
$R_9 = $ sulfopropyl, $n = 0$, $M^+ = $ K$^+$,

FS 43

FS 44

FS 45

FS 46

FS 47

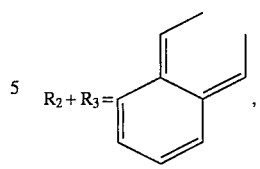

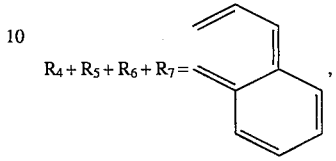

$X_1 = X_2 = S$, $R_1 = H$, $R_8 = $ sulphopropyl,
$R_9 = $ sulphobutyl, $n = 0$, $M^+ = $ ethyl$_3$N$^+$H,

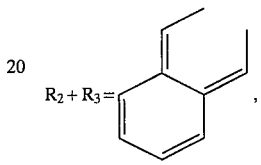

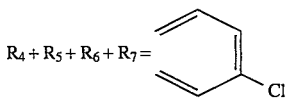

$X_1 = S$, $X_2 = O$, $R_1 = H$, $R_8 = $ sulphopropyl,
$R_9 = $ sulphoethyl, $n = 0$, $M^+ = $ ethyl$_3$N$^+$H,

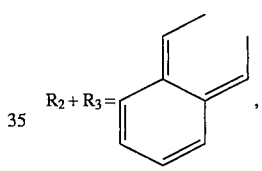

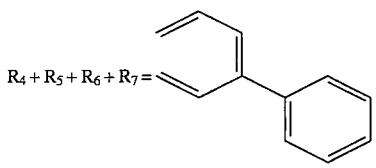

$X_1 = X_2 = S$, $R_1 = H$, $R_8 = $ sulphopropyl,
$R_9 = $ 3-methylsulphopropyl, $n = 0$, $M^+ = $ ethyl$_3$N$^+$H,

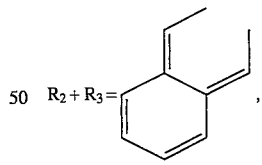

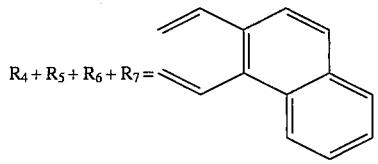

$X_1 = S$, $X_2 = O$, $R_1 = H$, $R_8 = $ sulphopropyl,
$R_9 = $ ethyl, $n = 0$,

FS 48

FS 49

FS 50

FS 51

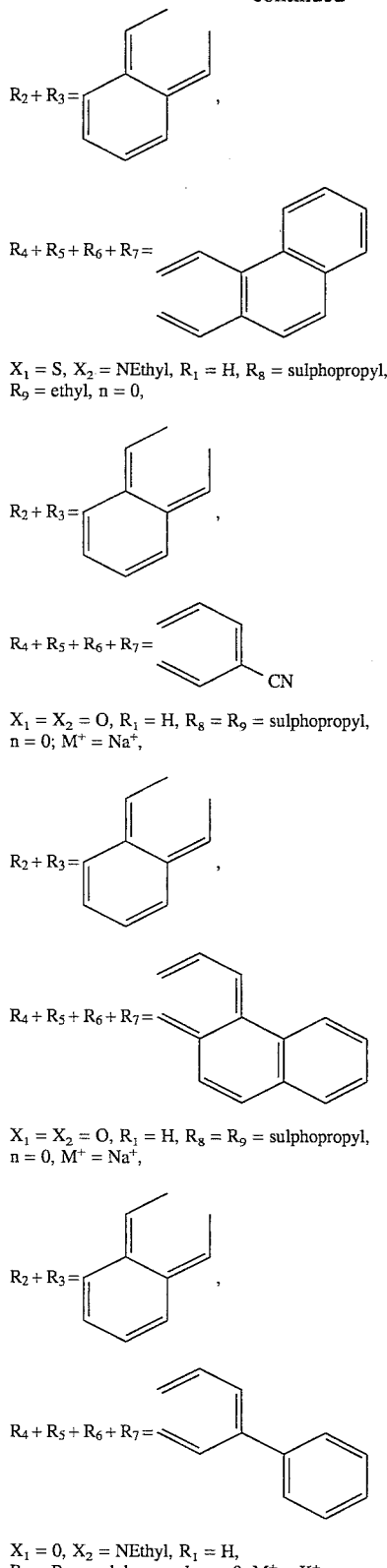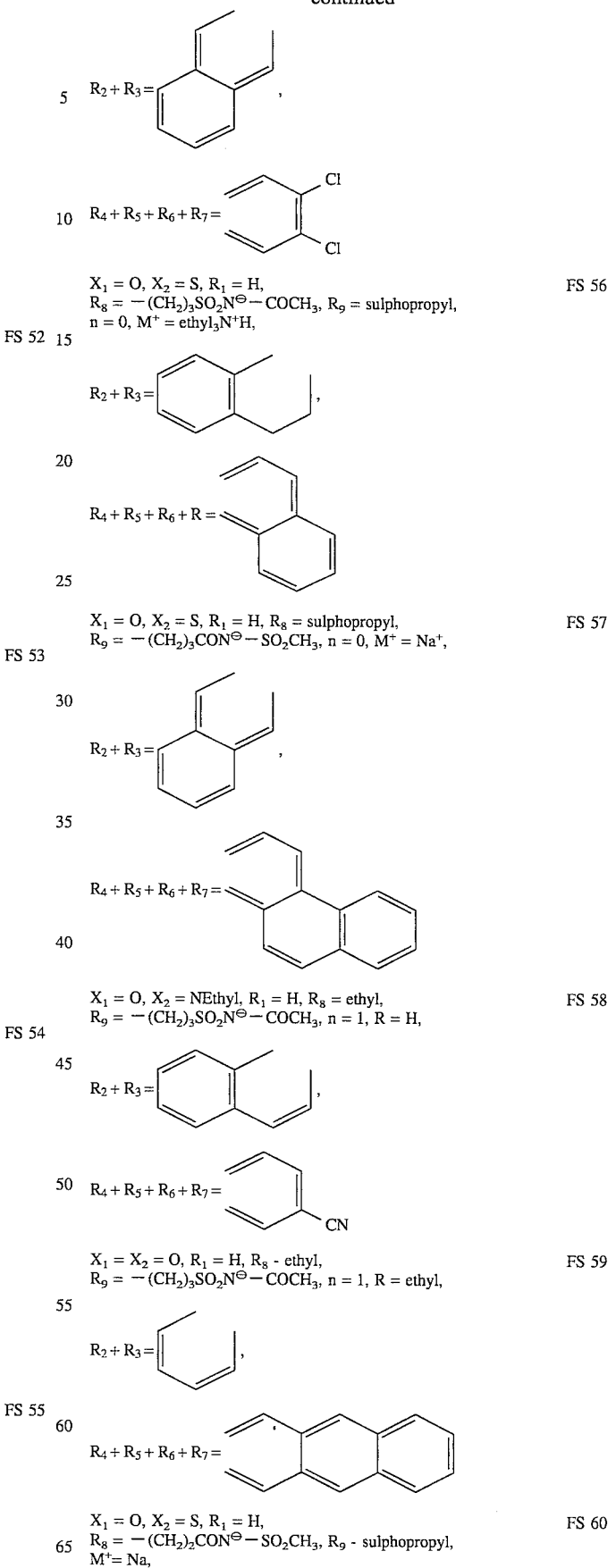

represented are merely displaced for bonding but not rotated. Thus it is invariably clear how the molecule is structured in each individual case.

The syntheses of the sensitizing dyes according to the invention and the preliminary stages are described below.

The preparative reaction path to trimethines containing a phenanthrooxazole element can be seen in Diagram 1.

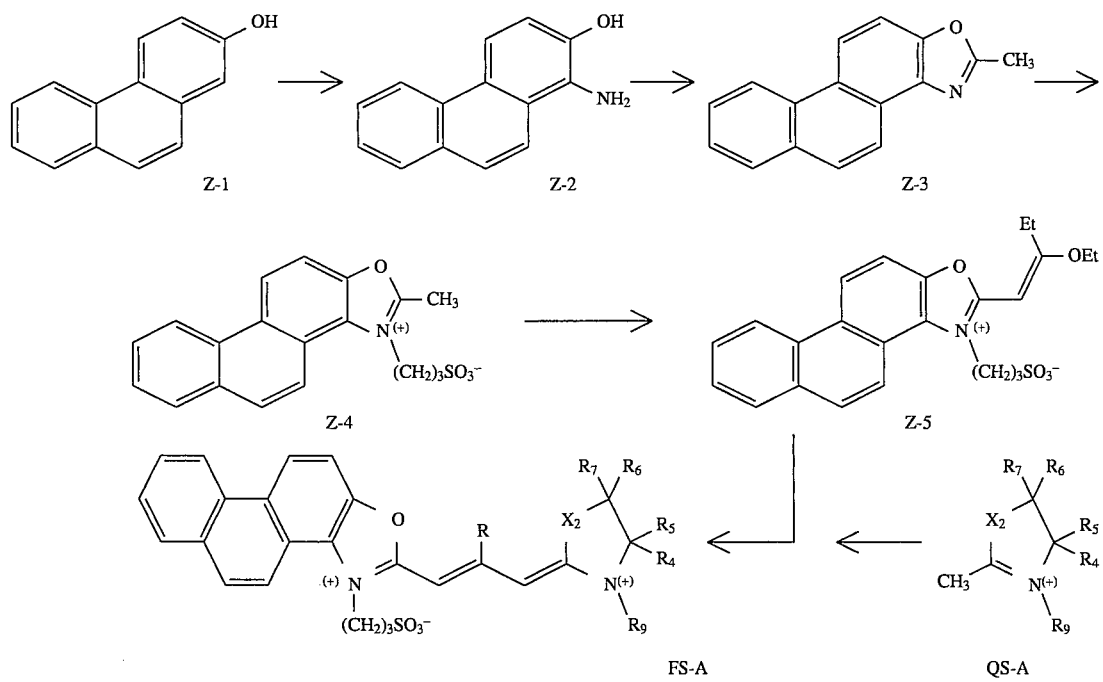

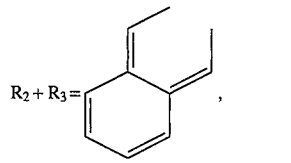

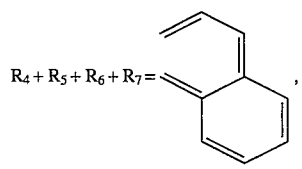

$X_1 = X_2 = S$, $R_1 = N$, $n = 1$,
$R = $ ethyl, $R_8 = -(CH_2)_3CON^{\ominus}-SO_2CH_3$,
$R_9 = $ ethyl, $R = H$,

FS 61

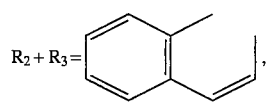

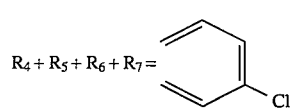

The divalent radicals which are designated by $R_2$ and $R_3$, $R_1$ and $R_2$ or $R_4$, $R_5$, $R_6$ and $R_7$, may always be bonded with the formula I in two different ways, whereby in many cases different products may be formed. The above notation is to be understood to mean that the divalent radicals in the plane Phenanthrol-2 (Z-1) was prepared by the method in L. F. Fieser, Organic Synthesis Coll. Vol. II, 482 (1945).

1-Aminophenanthrol-2 (Z-2) was synthesized successfully by azo coupling of diazotized sulphanilic acid with phenanthrol-2 (Z-1) and subsequent reduction of the azo dye formed (L. F. Tietze, Th. Eicher, Reaktionen und Synthesen, Georg Thieme Verlag, Stuttgart, New York, 2nd edition, page 161, 1991).

2-Methylphenanthro[1,2-d]oxazole (Z-3):

52.3 g (0.25 mol) of 1-aminophenanthrol-2 are reacted with 121.7 g (0.75 mol) of triethyl orthoacetate with stirring for 2 hours at 90° C. and the ethanol formed is distilled off. The reaction mixture is cooled to room temperature and purified by column chromatography using silica gel with methylene chloride as mobile solvent. The homogeneous fractions from the thin-layer chromatography are collected, evaporated in a vacuum and the residue is recrystallized hot from ligroin. Yield: 42.5 g (73.6% of the theoretical yield).

2-Methylphenanthro[1,2-d]oxazolio-3-propane sulphonate (z-4):

4.6 g (0.020 mol) of Z-3 and 2.7 g (0.022 mol) of propane sultone are stirred together in 1.5 ml of m-cresol for 1.5 h at 135° C. The reaction mixture is cooled to 70° C., 15 ml of ethanol is added and then cooling to room temperature takes place with stirring. The precipitate formed is filtered under suction, washed with ethanol and dried. Yield: 5.06 g (71.0% of the theoretical yield).

2-(2-Ethoxybutenyl)-3-ethylnaphtho[1,2-d]oxazolio-3-propane sulphonate (Z-5):

10.0 g (0.028 mol) of Z-4 and 11.3 ml (0.056 mol) of triethyl orthopropionate together with 12.5 ml of m-cresol are heated to between 110° and 120° C. with stirring, in the course of which Z-4 completely dissolves. After 0.5 h the reaction mixture is cooled to 50° C., 15 ml of acetone is added, whereby the product crystallizes out. After cooling to room temperature, the reaction mixture is filtered under suction, washed with acetone and the residue is decocted with 100 ml of acetone for 3 h, filtered under suction, washed with acetone and dried. Yield: 7.08 g (57.3% of the theoretical yield).

To obtain trimethine cyanines of the general formula FS-A (R=Et), Z-5 is reacted with a quaternary salt of the general formula QS-A. The preparation of FS4 may be used as an example of a trimethine synthesis.

5'-Chloro-9-ethyl-3,3'-bis(3-sulphopropyl)benzothiaphenanthro[1,2-d]oxazole carbocyanine (FS 4):

5 g (0.01 mol) of 2-methyl-5-chlorobenzothiazolio-3-propane sulphonate and 4.40 g (0.01 mol) of Z-5 are dissolved in 40 ml of phenoxyethanol with stirring at approximately 100° C. After cooling to room temperature, 0.68 g (0.01 mol) of sodium methylate is added, the reaction mixture is heated for 10 minutes at 90° C., cooled to room temperature, then 5 ml of water and 200 ml of acetone are added. The reaction mixture is crystallized out overnight, filtered under suction, washed first with acetone and then with ethanol. The crude dye is purified by medium pressure chromatography, the homogeneous fractions from the thin-layer chromatography are collected, evaporated in a vacuum and the residue is recrystallized. The crude dye is dissolved in methanol/water (=20/1), the solution is filtered and 70 ml of n-propanol is added. The dye is crystallized out overnight, filtered under suction and rewashed with n-propanol. The dye is dried to constant weight in a vacuum at 60° C. Yield: 0.94 g (13% of the theoretical yield).

The reaction path to trimethine cyanines containing not less than one anthrooxazole can be seen in Diagram 2. (The starting compound Z-10 was prepared from anthracenol-2, Z-6, (C. H. Bilger, P. Demerseman, R. Royen, J. Heterocyclic Chem. 22, 735 (1985)) in a manner analogous to Z-5.)

Diagram 2

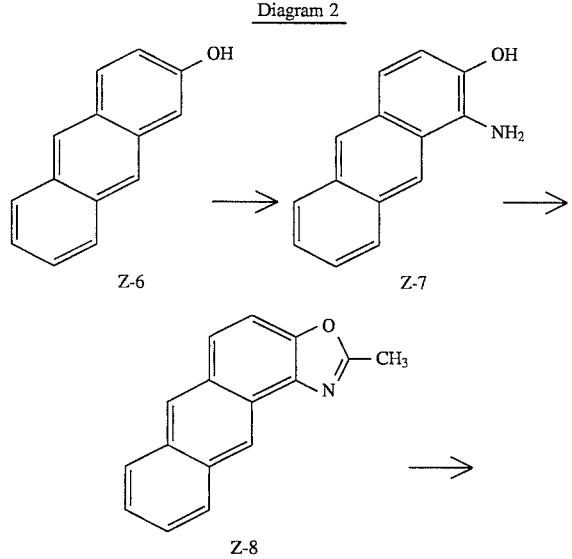

-continued
Diagram 2

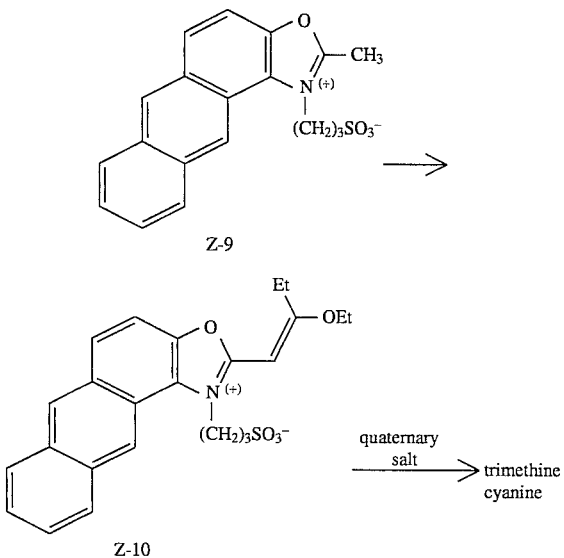

The description of the synthesis of FS 11 may be used as an example of the preparation of a trimethine cyanine containing an anthraoxazole.

9-Ethyl-3,3'-bis(3-sulphopropyl)-phenanthro[1,2-d]oxazole anthra[1',2'-d]oxazole carbocyanine (FS 11):

4.40 g (0.01 mol) of Z-10 and 3.55 g (0.01 mol) of Z-4 are suspended in 20 ml of DMF, 2.58 g (0.02 mol) of triethylamine is added with stirring and the reaction mixture heated to 60° C. After 0.5 h at the latest the educts are in solution and after 1 h at the earliest the dye begins to crystallize out. After cooling to room temperature, filtering under suction is carried out, the residue is dissolved in methanol and 4.10 g (0.02 mol) of potassium iodide dissolved in methanol is added. After filtering the precipitated dye under suction and washing with methanol, the crude dye is decocted with methanol for 3 h. After cooling to room temperature, the product is filtered under suction, washed and dried. Yield: 1.18 g (15% of the theoretical yield).

Diagram 3

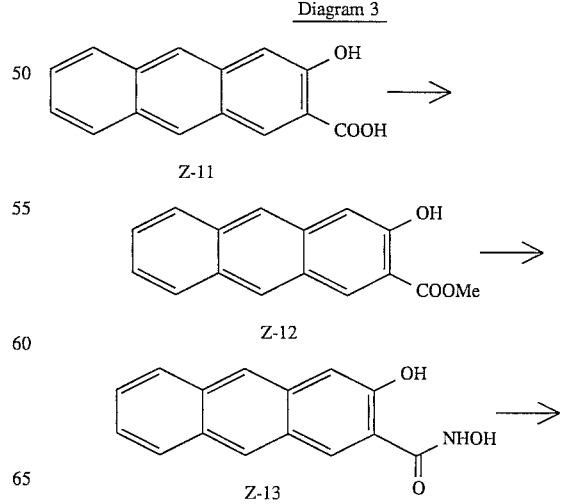

-continued
Diagram 3

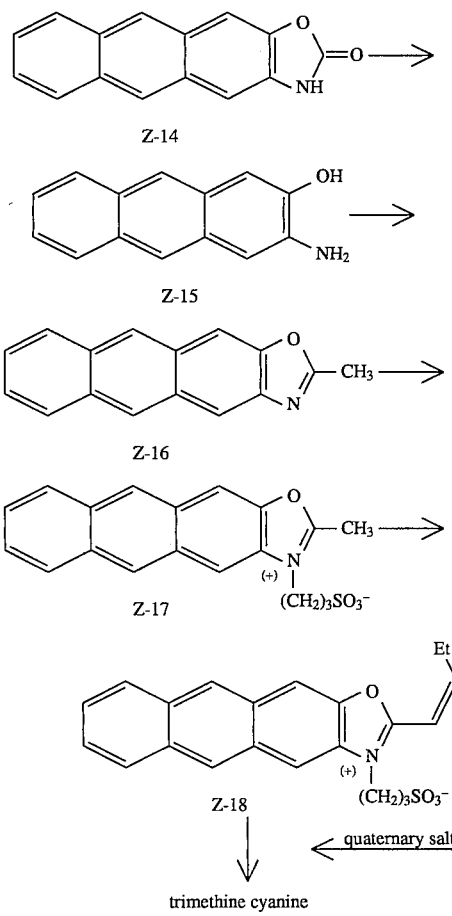

The intermediate compound Z-18 can be converted to trimethine cyanines by means of quaternary salts analogously to the reaction shown in Diagram 1.

Example of the synthesis of phenanthro- or anthrathiazole-containing trimethine cyanines and the preliminary stages thereof Anthra[1,2-d]thiazole, Z-19, (I. I. Levkoev, V. V. Durmashkina, J. Gen. Chem. (USSR), 15, 215–224 (1945); CA 2989/3 (1946)) can be converted to trimethine cyanines by the reaction shown in Diagram 4. The conversion reactions of Z-19 to trimethine cyanines take place analogously to those of Z-3 (Diagram 1). Condensation of the dye analogously to FS 11 is also possible.

Diagram 4

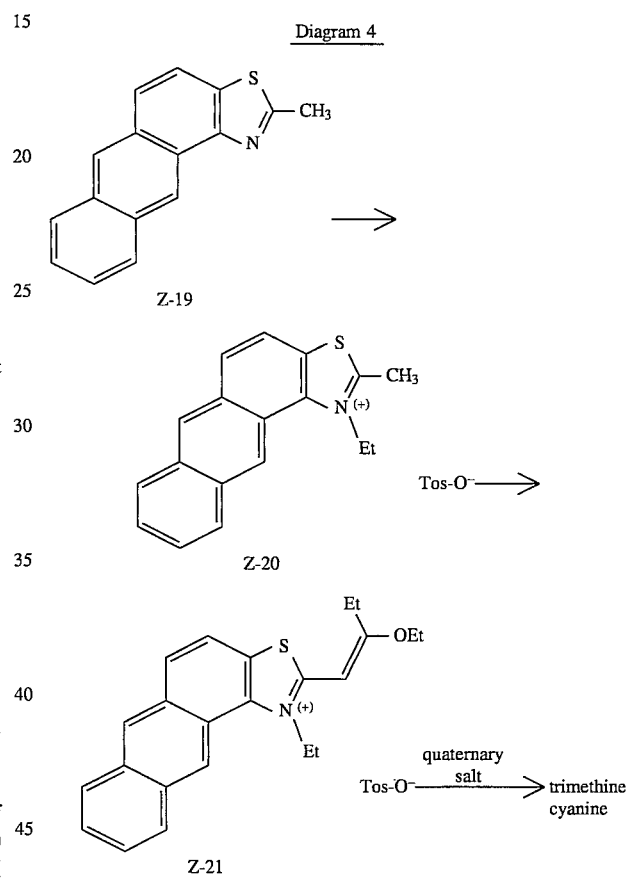

Starting from 2-carboxyanthracenol-2, Z-11, (D.R.P. 564 129 (1931)) the methyl ester is prepared (L. F. Tietze, Th. Eicher, Reaktionen und Synthesen, 2nd edition (1991) page 130), which is converted to hydroxamic acid Z-13 in the following manner.

3-(N-hydroxy)-carbonamide anthracenol-2 (Z-13):

37.8 g (0.150 mol) of Z-12 and 15.6 g (0.025 mol) of hydroxylammonium chloride are stirred in a mixture of 150 ml of water and 180 ml of ethanol while 21 g of NaOH dissolved in 95 l of water is added, and the reaction mixture is maintained at 40° C. for 3 h. After cooling to room temperature, the reaction mixture is acidified with concentrated hydrochloric acid, the precipitated product is filtered under suction, washed thoroughly with water and dried to constant weight. The crude product is dissolved in 600 ml of pyridine, filtered and 600 ml of water is added. After 18 h, the precipitate is filtered under suction, washed with water and dried to constant weight. Yield: 20.1 g (52.9% of the theoretical yield).

The further conversion to anthra[2,3-d]oxazolone, Z-14, takes place by means of a Lossen rearrangement (Houben-Weyl: Methoden der organischen Chemie). The saponification of Z-14 is carried out in aqueous sodium hydroxide and leads to an 85% yield of 3-aminoanthracenol-2, Z-15. The preparation of the oxazole base, Z-16, of the quaternary salt Z-17 and of the intermediate compound Z-18 (Diagram 3) is carried in a manner analogous to Z-3, Z-4 and Z-5 (Diagram 1).

2-Methylphenanthro[1,2-d]thiazole, Z-23, can be synthesized starting from N-acetyl-1-aminophenanthrene, Z-22, (W. E. Bachmann, Ch. H. Boatner, J. Amer. Chem. Soc., 58, 2097 (1936)) analogously to Z-19. The quaternization takes place analogously Z-3, and the formation of Z-25 analogously to Z-4. The condensation reactions of the dye may be conducted analogously to FS 4 or FS 11.

Diagram 5

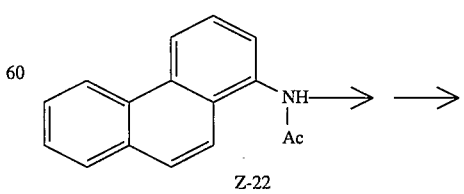

-continued
Diagram 5

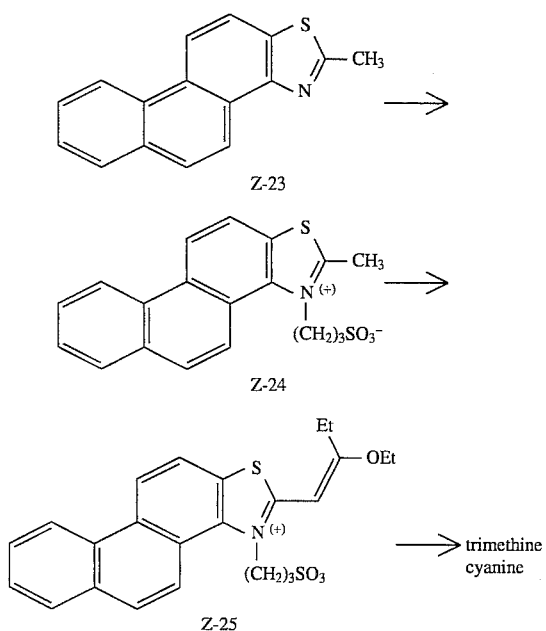

Examples of the synthesis of trimethine cyanines containing phenanthroimidazole and anthraimidazole.

Examples of the synthesis of trimethine cyanines containing phenanthroimidazole and anthraimidazole.

Diagram 6

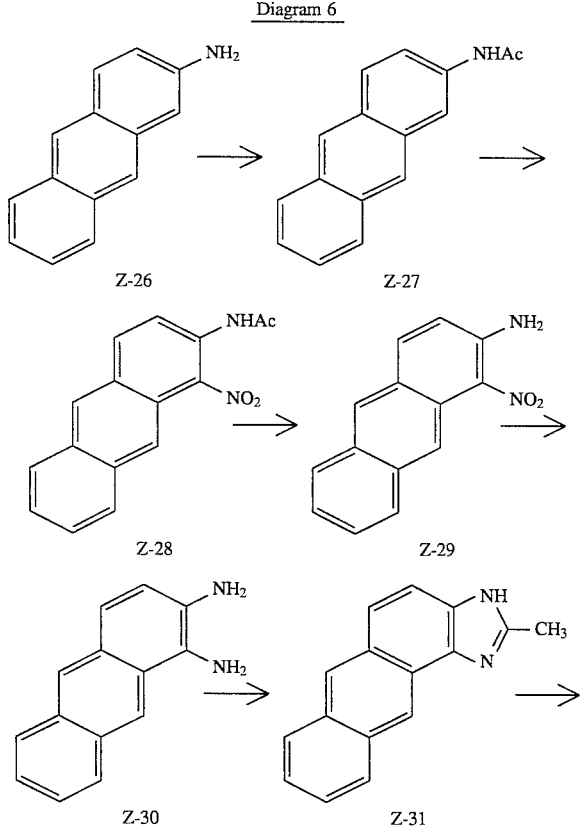

-continued
Diagram 6

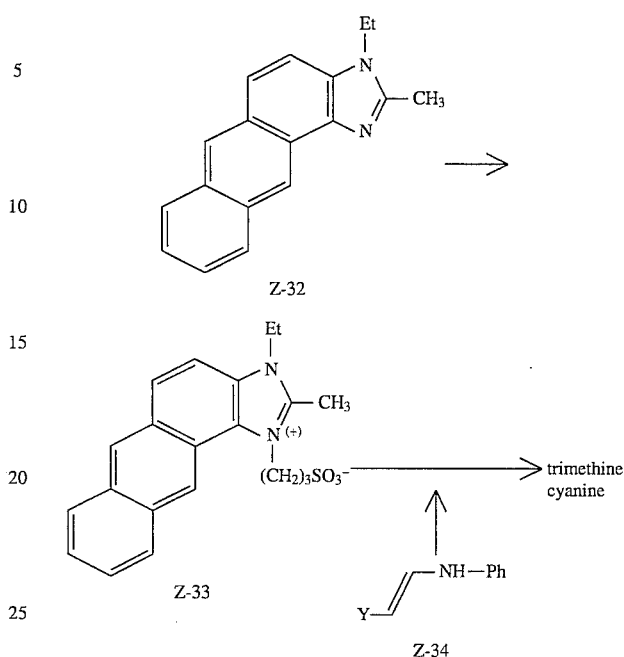

Y: azole, anellated azole

2-Amino-1-nitroanthracene, Z-29, can be prepared starting from 2-anthracenylamine, Z-26, (Helv. Chim. Acta 13, 429 (1990)) according to a known model synthesis (L. F. Tietze, Th. Eicher, Reaktionen und Synthesen, Georg Thieme Verlag, Stuttgart, New York, 2nd edition, pages 153 to 154, 1991). The reduction of the nitrocompound Z-29 to the diamine Z-30 (Houben-Weyl, Methoden der organischen Chemie) and subsequent ring-closure with triethyl orthoacetate leads (analogously to Z-3) to 2-methylanthra-[1,2-d] imidazole. The preparation of Z-32 by base-catalysed alkylation of Z-31 can be performed by use of the prescription for alkylation of 1H-imidazoles by B. Pilarski, Liebigs Ann. Chem., 1078 (1983). The quaternization to Z-33 takes place analogously to Z-4.

Starting from 1-aminophenanthrene, the corresponding 1-ethyl-2-methylphenanthro[1,2-d]imidazolio-3-propane sulphonate, Z-36, can be prepared analogously to Z-33.

Diagram 7

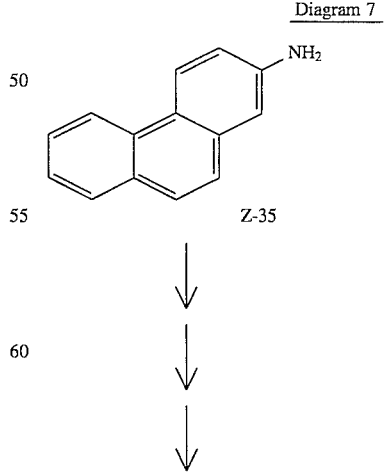

-continued
Diagram 7

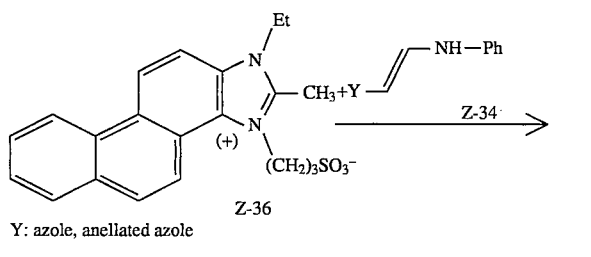

Y: azole, anellated azole trimethine cyanine

The synthesis of FS 39 may be used as an example of the preparation of a trimethine cyanine containing an anthraimidazole or a phenanthroimidazole (Diagram 8).

Diagram 8

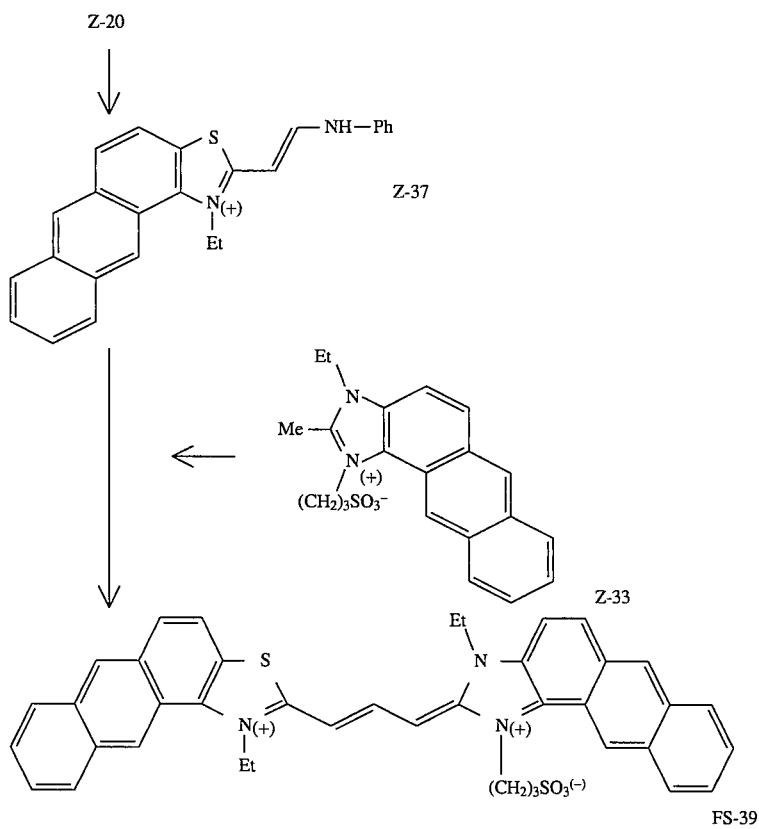

3-Ethyl-2-anilinovinylanthra[1,2-d]thiazolium tosylate (Z-37):

8.95 g (20 mmol) of Z-20 (preparation analogous to Z-4) is digested in 20 ml of m-cresol under a nitrogen atmosphere, 5.10 g (0.26 mmol) of diphenylformamidine is added and the mixture is stirred for 1.5 h at 120° C. After cooling to room temperature, 20 ml of acetone is added, the precipitate formed is filtered under suction and decocted with 100 ml of acetone for 1 h, filtered under suction after cooling to room temperature, rewashed with acetone, and the residue is decocted with 50 ml of ethanol for 2 h. After filtration under suction, washing with ethanol and drying to constant weight, 8.18 g (70.4% of the theoretical yield) of Z-37 is obtained.

Synthesis of the trimethine cyanine FS 39

5.53 g (10 mmol) of Z-37 is digested in 35 ml of DMF under a nitrogen atmosphere, 15 ml of acetic anhydride and 2.5 ml of triethylamine are added and the reaction mixture is stirred for 20 minutes at room temperature. After adding 3.82 g (10 mmol) of Z-33, stirring is carried out for 2.5 h at 70° C. After cooling to room temperature the precipitated dye is filtered under suction, washed with DMF and decocted with 100 ml of acetone for 2 h. After cooling to room temperature the material is filtered under suction, washed with acetone and the residue is decocted with 100 ml of methanol for 3 h. After cooling to room temperature, the product is filtered under suction, washed with methanol and dried. Yield: 2.76 g (40.1% of the theoretical yield).

The synthesis of the anthra- and phenanthroazole monomethine cyanines takes place in accordance with the directions of D. John Mee, Res. Discl., 182, 301–3 (1979) and is demonstrated by the example of FS 44 (Diagram 9). Directions for the synthesis of monomethine cyanine FS 44:

1.75 g (5.0 mmol) of Z-38 (for preparation, refer to D. John Mee) and 1.78 g (5.0 mmol) of Z-44 are suspended in 15 ml of formamide at room temperature, 1.55 g (15 mmol) of acetic anhydride is added, followed by the addition of 1.65 g (16.5 mmol) of triethylamine under cooling, so that the temperature does not rise above 20° C. After 2 h, the educts are in solution, after a further 18 h 116 ml of acetone is added, the precipitated dye is filtered under suction, rewashed with acetone and decocted with 100 ml of ethanol for 1 h. The dye is filtered under suction, washed with ethanol and dried. Yield: 2.26 g (68.5% of the theoretical yield).

Diagram 9

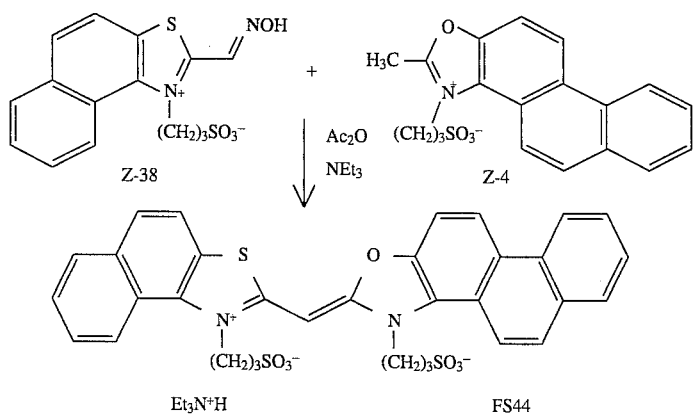

With the sensitizing dyes according to the invention, a sensitization is attained which not only leads to higher sensitivity but which is also stable in the blue spectral region between 400 and 490 nm, in the green spectral region between 530 and 590 nm and in the red spectral region between 600 and 680 nm.

Even higher sensitivities in the green spectral region are attained by means of a mixture of one or two sensitizing dyes of the general formula II:

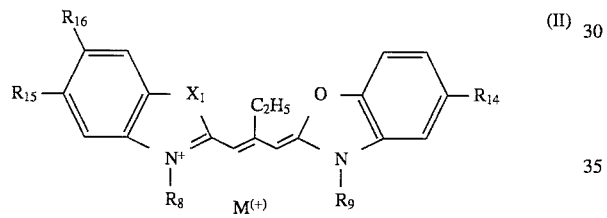

wherein $X_1$ stands for O, S, Se or $NR_8$;

$R_{14}$, $R_{15}$, $R_{16}$ stands for hydrogen, alkyl (such as methyl), aryl (and as phenyl), halogen (such as chlorine), alkoxy (such as methoxy), —CN, —CHal$_3$ (such as —CF$_3$), —COR (wherein R stands for —OH, alkoxy, aryloxy or an amino group), wherein $R_8$, $R_9$ and $M^{\oplus}$ have the meaning given above.

Suitable examples of sensitizing dyes of formula II are:

II-1: $R_{14}=R_{15}$=phenyl, $R_8$, $R_9$=—(CH$_2$)$_2$SO$_3^{\oplus}$, $M^{\oplus}$=K$^{\oplus}$, $R_{16}$=H, $X_1$=O, II-2: $R_{14}=R_{15}$=phenyl, $R_8$, $R_9$=—(CH$_2$)$_3$SO$_3^{\ominus}$, $M^{\oplus}$=K$^{\oplus}$, $R_{16}$=H, $X_1$=O, II-3: $R_{14}=R_{15}$=phenyl, $R_8$, $R_9$=—(CH$_2$)$_2$CHMe—SO$_3^{\ominus}$, $M^{\oplus}$=K$^{\oplus}$, $R_{16}$=H, $X_1$=O, II-4: $R_{14}=R_{15}$=phenyl, $R_8$=—(CH$_2$)$_3$SO$_3^{\ominus}$, $R_9$=—(CH$_2$)$_2$—SO$_3^{\ominus}$, $M^{\oplus}$=K$^{\oplus}$, $R_{16}$=H, $X_{1=O}$, II-5: $R_{14}$=Cl, $R_{15}$=phenyl, $R_8$, $R_9$=—(CH$_2$)SO$_3^{\ominus}$, $M^{\oplus}$=Na$^{\oplus}$, $R_{16}$=H, $X_1$=O, II-6: $R_{14}$=Cl, $R_{15}$=phenyl, $R_9$=—(CH$_2$)$_3$SO$_3^{\ominus}$, $M^{\oplus}$=Na$^{\oplus}$, $R_{16}$=H, $X_1$=O, $R_8$=—(CH$_2$)$_2$CHMeSO$_3^{\ominus}$, II-7: $R_{14}$=Cl, $R_{15}$=methyl, $R_{16}$=—OCH$_3$, $X_1$=S, $R_8$=sulphobutyl, $R_9$=sulphopropyl, $M^{\oplus}$=Na$^{\oplus}$, II-8: $R_{14}$=Cl, $R_{15}$=methyl, $R_{16}$=—OCH$_3$, $X_1$=S, $R_8=R_9$=sulphopropyl, $M^{\oplus}$=Na$^{\oplus}$, II-9: $R_{14}$=phenyl, $R_{15}=R_{16}$=CH$_3$, $X_1$=S, $R_8$=sulphobutyl, $R_9$=sulphoethyl, $M^{\oplus}$=Na$^{\oplus}$, II-10: $R_{14}$=phenyl, $R_{15}=R_{16}$=CH$_3$, $X_1$=S, $R_8=R_9$=sulphopropyl, $M^{\oplus}$=Na$^{\oplus}$.

Higher sensitivities in the red spectral region are attained by means of a mixture of one or two sensitizing dyes of the general formula III:

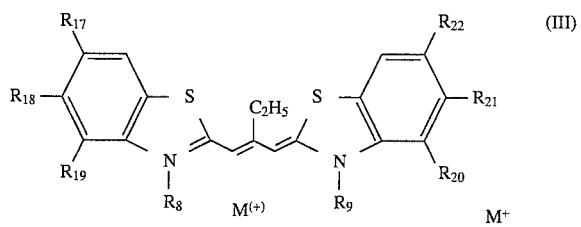

wherein $R_{17}$, $R_{18}$, $R_{19}$, $R_{20}$, $R_{21}$, $R^{22}$ represent hydrogen, alkyl, aryl, halogen, alkoxy, —CN, —CHal$_3$, —COR (wherein R stands for —OH, alkoxy, aryloxy or an amino group), or $R_{18}$ together with $R_{17}$ or $R_{19}$ and/or $R_{21}$ together with $R_{20}$ or $R_{22}$ represent the necessary residue for completing a naphthothiazole ring system, wherein $R_8$, $R_9$ and $M^{\oplus}$ have the meaning given for formula I.

Suitable examples of sensitizing dyes of the formula III are:

III-1: $R_{17}$, $R_{19}$, $R_{20}$, $R_{22}$=H; $M^{\oplus}$=Na$^{\oplus}$; $R_{18}$, $R_{21}$=Cl; $R_8$, $R_9$=sulphopropyl;

III-2: $R_{17}$, $R_{19}$, $R_{20}$, $R_{22}$=H; $R_{18}$, $R_{21}$=Cl; $R_8$=sulphopropyl; $R_9$=ethyl;

III-3: $R_{17}$, $R_{22}$=H; $R_{18}$ together with $R_{19}$ and $R_{20}$ together with $R_{21}$ represent —CH=CH—CH=CH—; $R_8$, $R_9$=sulphopropyl; $M^{\oplus}$=HN$^{\oplus}$(C$_2$H$_5$)$_3$;

III-4: $R_{17}$, $R_{22}$=H, $R_{18}$ together with $R_{19}$ and $R_{20}$ together with $R_{21}$ represent —CH=CH—CH=CH—; $R_8$=sulphopropyl; $R_9$=ethyl;

III-5: $R_{19}$, $R_{20}$=H; $R_{17}$ together with $R_{18}$ and $R_{21}$ together with $R_{22}$ represent —CH=CH—CH=CH—; $R_8$, $R_9$=sulphopropyl; $M^{\oplus}$=HN(C$_2$H$_5$);

III-6: $R_{19}$, $R_{20}$=H; $R_{17}$ together with $R_{18}$ and $R_{21}$ together with $R_{22}$ represent —CH=CH—CH=CH—; $R_8$=sulphopropyl, $R_9$=ethyl;

III-7: $R_{17}$, $R_{20}$, $R_{22}$=H; $R_{18}$ together with $R_{19}$ represent —CH=CH—CH=CH—; $R_{21}$=Cl; $R_8$, $R_9$=sulphopropyl; $M^{\oplus}$=Na$^{\oplus}$;

III-8: $R_{17}$, $R_{20}$, $R_{22}$=H; $R_{18}$ together with $R_{19}$ represent —CH=CH—CH=CH—; $R_{21}$=Cl; $R_8$=sulphopropyl;

$R_9$=ethyl; p1 III-9: $R_{17}$, $R_{20}$, $R_{22}$=H; $R_{18}$ together with $R_{19}$ represent —CH=CH—CH=CH—; $R_{21}$=Cl; $R_8$=ethyl; $R_9$=sulphopropyl;

III-10: $R_{17}$ together with $R_{18}$ and $R_{20}$ together with $R_{21}$ represent —CH=CH—CH=CH; $R_{19}$, $R_{22}$=H; $R_8$, $R_9$=sulphopropyl; $M^{\oplus}$=$Na^{\oplus}$;

III-11: $R_{17}$ together with $R_{18}$ represent —CH=CH—CH=CH; $R_{19}$, $R_{20}$, $R_{22}$=H; $R_{21}$=Cl; $R_8$, $R_9$=sulphopropyl; $M^{\oplus}$=$Na^{\oplus}$.

EXAMPLES

Example 1

Using the sensitizing dye FS 4, a light-sensitive material for colour photography was prepared in the following manner.

41.3 mg of the stabilizer ST, dissolved in 6.88 g of water and 0.12 g of 1N NaOH, is added to 100 g of a silver bromide emulsion containing 10 mol-% of AgI (silver content expressed in $AgNO_3$: 205.6 g per kg of emulsion) having a wide particle size distribution centred around 1.41 μm. After stirring for 45 minutes at 45° C., 22.7 mg of FS 4 dissolved in 22.7 ml of methanol is added and stirring is continued for 60 minutes at 40° C. Then 20 mg of ST-A dissolved in 4 g of water is added, and the mixture is stirred for 10 minutes at 40° C.; then 1.26 g of the coupler K-1 and 1.89 g of the coupler K-2, both emulsified together in 50.4 g of water, 3.15 g of tricresyl phosphate and 0.22 g of the wetting agent NM, are added with stirring. Following the addition of 120.0 ml of 5% by weight of aqueous gelatine and 100 ml of water, 81 mg of wetting agent NM dissolved in a mixture of 1.6 ml of water and 0.4 ml of methanol is added. After a further 15 minutes the emulsion is poured off and subsequently cured.

Further materials were prepared in the same manner with the difference that other sensitizing dyes were used instead of the sensitizing dye according to the invention, FS 4, as shown in Table 1. The sensitivity of the materials thus prepared was determined. For this purpose samples of the materials were exposed behind a wedge and subjected to colour negative processing as described in "The Journal of Photographic Science", 1974, pages 597 and 598. The results are summarised in Table 1.

TABLE 1

|      | Sensitivity * | $\lambda_{max}$ [nm] ** |
|------|---------------|-------------------------|
| FS 4 | 1.00          | 596                     |
| V-1  | 0.95          | 600/558                 |
| V-2  | 0.89          | 600/550                 |
| V-3  | 0.98          | 600                     |
| V-4  | 0.98          | 598                     |
| V-5  | 0.97          | 601                     |

\* Scaled to the sensitivity of FS 4
\*\* $\lambda_{max}$: sensitization maximum Reference compounds V-1 to V-5:

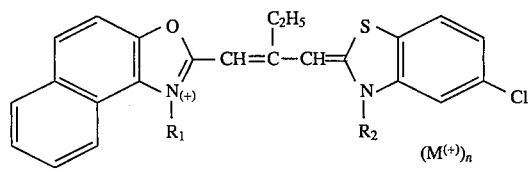

V-1 $R_1$=sulphopropyl; $R_2$=ethyl, n=0,

V-2 $R_1$=sulphopropyl; $R_2$=sulphoethyl, n=1, $M^{\oplus}$=$Na^{\oplus}$,

V-3 $R_1$, $R_2$=sulphopropyl, n=1, $M^{\oplus}$=$Na^{\oplus}$,

V-4 $R_1$=sulphopropyl; $R_2$=sulpho-n-butyl, n=1, $M^{\oplus}$=$Na^{\oplus}$,

V-5 $R_1$=sulphopropyl; $R_2$=—$(CH_2)_2$—$CH(CH_3)$—$SO_3^{\ominus}$, n=1, $M^{\oplus}$=$Na^{\oplus}$.

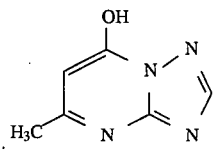

ST

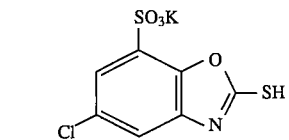

ST-A $C_8H_{11}SO_3^{\ominus}N^{\oplus}(C_2H_5)_4$

NM

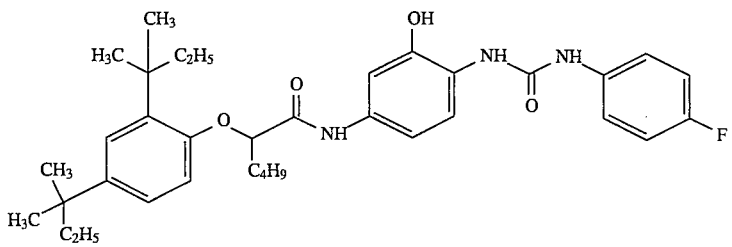

K-1

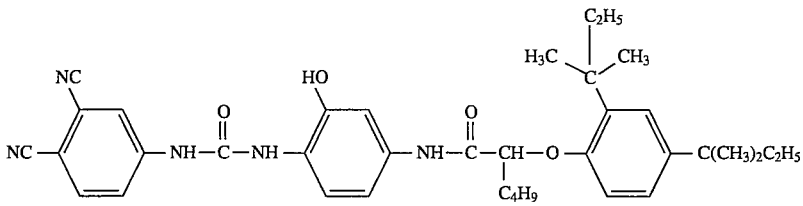

K-2

Example 2

In the manner described in Example 1, the sensitivities were determined of correspondingly prepared materials which were in addition sensitized with a sensitizing dye of the general formula III. The dye of the formula III was used in the same quantity as the dye of the formula I and the reference dye. With each pair of dyes, the surface coverage attained was identical to that in Example 1. The sensitivity values are shown in Table 2.

TABLE 2

| Sample | Sensitivity * | $\lambda_{max}$ [nm] |
| --- | --- | --- |
| FS 4/III-1 | 1.00 | 599 |
| V-1/III-1 | 0.98 | 600–625 |
| V-2/III-1 | 0.93 | 600/630 |
| V-3/III-1 | 0.96 | 600–625 |
| V-4/III-1 | 0.97 | 600–625 |
| V-5/III-1 | 0.97 | 600–620 |

* Sensitivities are scaled to that of FS 4/III-1

Example 3

Using the sensitizing dye FS 1, a light-sensitive material was prepared in the following manner.

41.3 mg of the stabilizer ST, dissolved in 6.88 g of water and 0.12 g of 1N NaOH, is added to 100 g of a silver bromide emulsion containing 10 mol-% of AgI (silver content expressed in $AgNO_3$:205.6 g per kg of emulsion) having a wide particle size distribution centred around 1.41 μm.

After stirring for 45 minutes at 45° C., 21.1 mg of FS 1 dissolved in a mixture of 6.8 g of m-cresol and 15.9 g of methanol is added and stirred is continued for 60 minutes at 40° C. Then 20 mg of ST-A dissolved in 4 g of water is added and the mixture is stirred for 10 minutes at 40° C.; then 4 g of the coupler K-3 emulsified in 4 g of tricresyl phosphate and 58 g of water is added with stirring. Following the addition of 120.0 mg of 5% by weight of aqueous gelatine, 81 g of wetting agent NM dissolved in a mixture of 1.6 ml of water and 0.4 ml of methanol is added. After a further 15 minutes the emulsion is poured off and subsequently cured.

shown in Table 3. The sensitivity of the materials thus prepared was determined. For this purpose samples of the materials were exposed behind a wedge and subjected to colour negative processing as described in "The Journal of Photographic Science", 1974, pages 597 and 598. The results are summarized in Table 3.

TABLE 3

| Sample | Sensitivity * | $\lambda_{max}$ [nm] |
| --- | --- | --- |
| FS 1 | 1 | 565 |
| V-6 | 0.97 | 560 |
| V-7 | 0.96 | 560 |
| V-8 | 0.68 | 540 |

* Sensitivities are scaled to that of FS 1

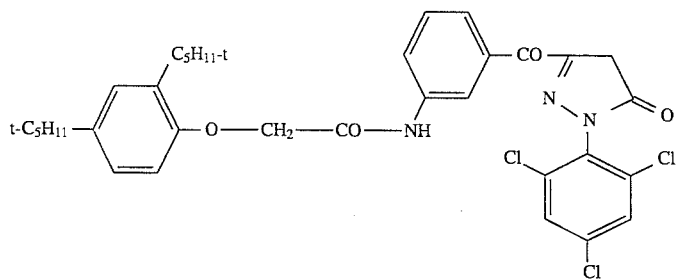

K-3

Further materials were prepared in the same manner with the difference that other sensitizing dyes were used instead of the sensitizing dye according to the invention, FS 1, as

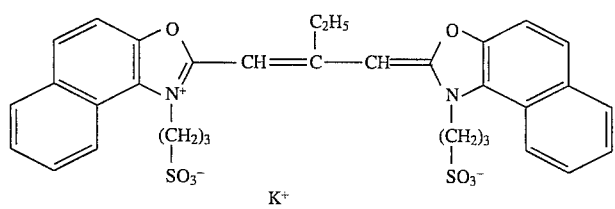

V-6

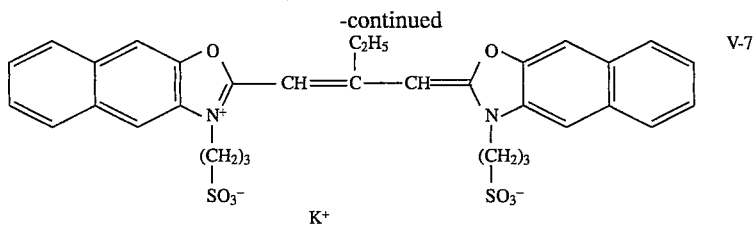

V-7

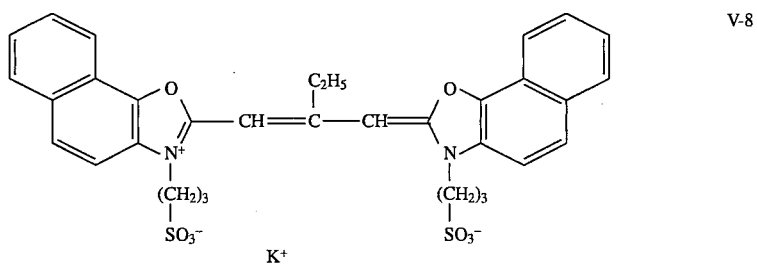

V-8

Example 4

In the manner described in Example 3, the fresh sensitivities were determined of correspondingly prepared materials which were in addition sensitized with a sensitizing dye of the general formula II. The dye of the formula II was used in the same quantity as the dye of the formula I and the reference dye. With each pair of dyes, the surface coverage attained was identical to that in Example 3. The sensitivity values are shown in Table 4.

TABLE 4

| Sample | Sensitivity * | $\lambda_{max}$ [nm] |
|---|---|---|
| II-4/FS 1 | 1.00 | 550 |
| II-4/V-6 | 0.98 | 550 |
| II-4/V-7 | 0.96 | 548 |
| II-4/V-8 | 0.89 | 545 |

* Sensitivities are scaled to that of II-4/FS 1

Example 5

Using the sensitizing dye FS 44, a light-sensitive material was prepared in the following manner.

After stirring for 45 minutes at 40° C., 13.5 mg of FS 44 dissolved in a mixture of 1.35 g of phenoxyethanol and 12.15 g of methanol is added to 100 g of a silver chloride emulsion (silver content expressed in $AgNO_3$: 212 g of $AgNO_3$ per kg of emulsion). After further stirring for 60 minutes at 40° C., 6 mg ST-B dissolved in 6 ml of water, 112.5 mg of potassium bromide dissolved in 12 ml of water and 2.2 mg of ST-C dissolved in 5 ml of a dilute solution of sodium hydroxide are added. After stirring for 10 minutes at 40° C. there are added 50 ml of water, 81 g of a 20% by weight gelatine solution, 14.0 g of coupler K-4 and 6.2 g of coupler K-5 emulsified in 204 g of water and 33.3 g of an oil-former O-1 (a mixed polyester from adipic acid and a mixture of 1,3-butanediol, 1,4-butanediol and 2-ethylpropanediol) as well as 0.32 g of NM-1 dissolved in 8 ml of water. After a further 15 minutes the emulsion is poured off and subsequently cured.

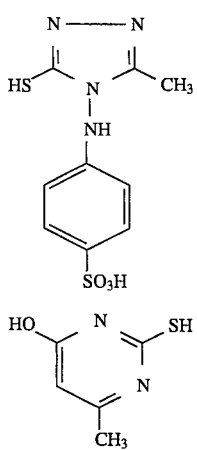

ST-B

ST-C

K-4

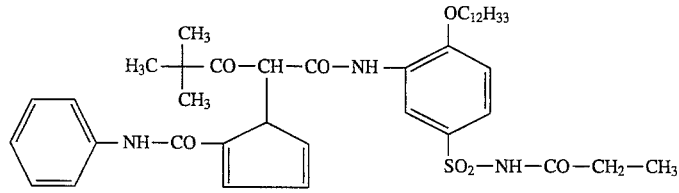

K-5

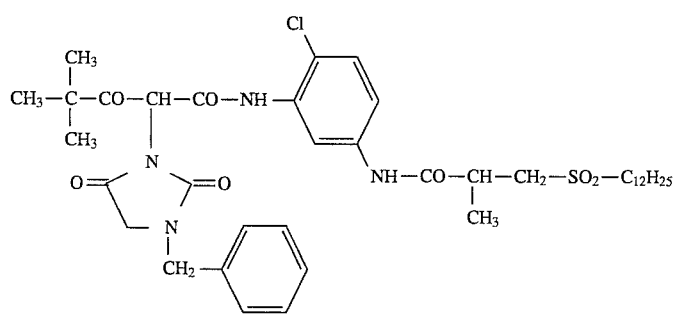

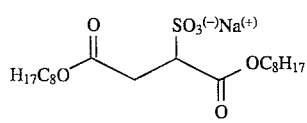

Further materials were prepared in the same manner with the difference that other sensitizing dyes were used instead of the sensitizing dye according to the invention FS 44, as shown in Table 5. The sensitivity of the materials thus prepared was determined. For this purpose samples of the materials were exposed behind a wedge and subjected to colour negative processing as described in "The Journal of Photographic Science", 1974, pages 597 and 598. The results are summarised in Table 5.

TABLE 5

| Sample | Sensitivity * | $\lambda_{max}$ [nm] |
|---|---|---|
| FS 44 | 1.00 | 470 |
| V-9 | 0.44 | 455 |
| V-10 | 0.49 | 455 |

* Sensitivities are scaled to that of FS 44

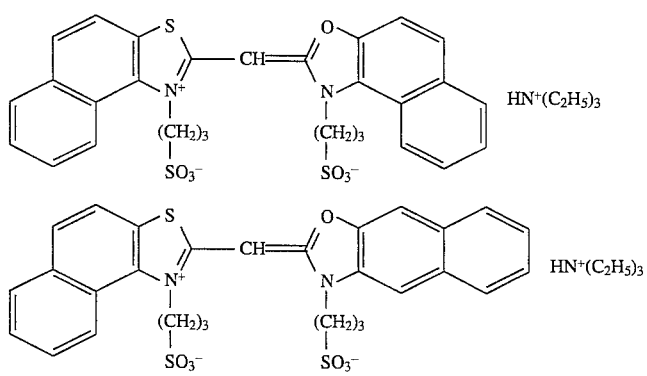

V-10

V-9

I claim:

1. A photographic recording material comprising at least one light-sensitive silver halide emulsion layer, whereby the silver halide is spectrally sensitized by a cyanine dye of the general formula I,

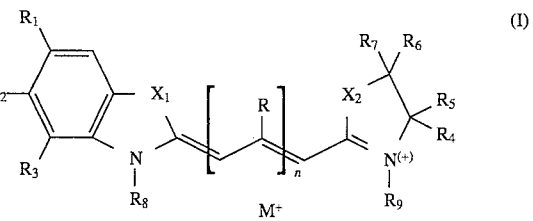

wherein the symbols have the following meanings;

$X_1$ and $X_2$ are the same or different and are O, S, Se or $NR_{10}$;

$R_1$ and $R_2$ or $R_2$ and $R_3$ are residues to complete an optionally substituted phenanthroazole or anthraazole with the remaining group $R_3$ or $R_1$ signifying hydrogen;

$R_4$ and $R_6$ are the same or different and are hydrogen or together a π-bond, $R_5$ and $R_7$ are the same or different and are hydrogen, alkyl or aryl or $R_4$, $R_5$, $R_6$ and $R_7$ are the same or different and are residues of an unsubstituted or substituted benzazole, naphthazole, phenanthroazole or anthraazole;

$R_8$ and $R_9$ are the same or different and are alkyl, sulphoalkyl, carboxyalkyl, $-(CH_2)_m-CO-NR_{11}-SO_2-R_{12}$ or $-(CH_2)_m-SO_2-NR_{11}-CO-R_{12}$;

$R_{10}$ is a residue as defined for $R_8$ or aryl;

$R_{11}$ is hydrogen or the negative charge ($^\ominus$) which remains when a proton is removed;

$R_{12}$ is alkyl, aryl, $-O^\oplus$ or $-N(R_{13})_2$;

$R_{13}$ is hydrogen, alkyl or aryl (the same or different);

R is hydrogen, $C_1-C_4$-alkyl, $C_1-C_4$-alkylthio or phenyl;

m is an integer from 1 to 10;

n is 0 or 1; and $M^+$ is a cation optionally required to neutralize the charge, with the proviso that at least one of $R_8$ or $R_9$ is selected from the group consisting of a sulphoalkyl group, a carboxyalkyl group, a group $-(CH_2)_m-CO-NR_{11}-SO_2-R_{12}$ and a group $-(CH_2)_m-SO_2-NR_{11}-CO-R_{12}$.

2. Photographic recording material as claimed in claim 1, wherein the silver halide is additionally spectrally sensitized with at least one cyanine dye of the general formula II

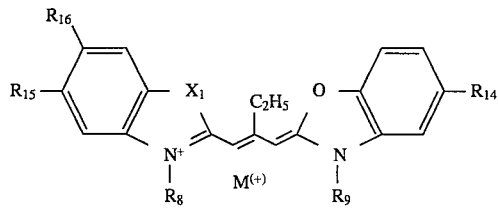

wherein

X represents O, S, Se or $NR_8$;

$R_{14}$, $R_{15}$ and $R_{16}$ represent hydrogen, alkyl, aryl, halogen, alkoxy, $-CN$, $-CHal_3$, $-COR$ wherein R stands for $-OH$, alkoxy, aryloxy or an amino group, wherein $R_8$, $R_9$ and $M^\oplus$ have the meaning given for formula I.

3. Photographic recording material as claimed in claim 1, wherein the silver halide is additionally spectrally sensitized with at least one cyanic dye of the general formula III

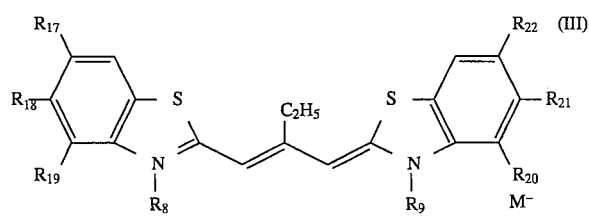

wherein $R_{17}$, $R_{18}$, $R_{19}$, $R_{20}$, $R_{21}$, $R_{22}$ are the same or different and represent hydrogen, alkyl, aryl, halogen, alkoxy, $-CN$, $-CHal_3$, $-COR$ wherein R stands for $-OH$, alkoxy, aryloxy or an amino group, or $R_{18}$ together with $R_{17}$ or $R_{19}$ and/or $R_{21}$ together with $R_{20}$ or $R_{22}$ represent the necessary residue for completing anaphthothiazole ring system, wherein $R_8$, $R_9$ and $M^\oplus$ have the meaning given for formula I.

* * * * *